United States Patent [19]

Ramras

[11] 4,234,446
[45] Nov. 18, 1980

[54] METHOD AND APPARATUS FOR PRODUCING CHLORINE DIOXIDE

[75] Inventor: Daniel Ramras, Seattle, Wash.

[73] Assignee: Kenneth T. Place, Corvallis, Oreg.

[21] Appl. No.: 82,989

[22] Filed: Oct. 9, 1979

[51] Int. Cl.³ ............................................. C01B 11/02
[52] U.S. Cl. ................................. 252/187 R; 422/193; 424/149; 423/477
[58] Field of Search ...................... 423/477, 478, 479; 8/108 A; 424/149; 252/187 R

[56] References Cited

U.S. PATENT DOCUMENTS

| | | | |
|---|---|---|---|
| 2,344,346 | 3/1944 | Evans | 423/478 |
| 2,641,528 | 6/1953 | Audoynaud | 423/478 |
| 2,664,341 | 12/1953 | Kesting | 423/478 |
| 2,881,052 | 4/1959 | Julien | 423/479 |
| 4,013,761 | 3/1977 | Ward | 423/477 |

FOREIGN PATENT DOCUMENTS 535201 1/1957 Canada ................................ 423/477

Primary Examiner—Brian E. Hearn
Attorney, Agent, or Firm—Chernoff & Vilhauer

[57] ABSTRACT

Apparatus and continuous-flow process for producing a solution of chlorine dioxide by reaction between a hypochlorite, a chlorite and an acid in a gas generator-reactor comprising a plurality of separate reaction chambers interconnected in series arrangement, in which liquid reactants flow through successive stages, but chlorine dioxide is prevented from flowing between stages. A water-driven venturi eductor removes gaseous reaction products and maintains a vacuum within the reaction chambers. Gaseous reaction products are mixed with the eductor exhaust water. A separate eductor may be provided to remove liquid products of reaction from the gas generator-reactor.

7 Claims, 4 Drawing Figures

METHOD AND APPARATUS FOR PRODUCING CHLORINE DIOXIDE

BACKGROUND OF THE INVENTION

The present invention relates to chlorine dioxide production, and more particularly to apparatus for production of chlorine dioxide in a continuous-flow process.

Chlorine dioxide is of considerable commercial importance as a bleaching agent used in paper production, and is becoming increasingly important for use in aqueous solution as an oxidant biocide for water purification, odor removal, slime removal, and treatment of industrial wastes. Production of chlorine dioxide has, in the past, been accomplished through numerous different chemical reactions, and in many different types of apparatus. Previously known processes and apparatus have, however, presented numerous difficulties, and have not been particularly efficient.

A serious problem of production of chlorine dioxide is that chlorine dioxide gas readily forms a dangerously explosive mixture with air. Kesting U.S. Pat. No. 2,664,341 discloses a continuous-flow process and apparatus for the production of chlorine dioxide in a non-explosive manner by a reaction of sodium chloride, sodium chlorate, water and hydrochloric acid, carried out in a number of reaction vessels in a descending arrangement to produce a mixture of chlorine dioxide and chlorine. The Kesting apparatus, however, is pressurized, as it requires addition of steam and air to heat the reactants and to dilute the chlorine dioxide produced, to prevent explosive mixtures of chlorine dioxide and air from being formed. The gases evolved in each stage of the Kesting process are forced through interconnecting tubing into the liquid reactants in the next higher stage, as a means of transferring heat from stage to stage of the reactor apparatus. As a result of this pressurized gas flow, the efficiency of liberation of chlorine dioxide is reduced.

Another problem with production of chlorine dioxide has been that the chemical reactions used in many previously known continuous-flow processes also produce free chlorine gas. For example, the processes disclosed in Rapson U.S. Pat. Nos. 2,863,722 and 3,789,108, Kesting U.S. Pat. No. 2,664,341, Fuller U.S. Pat. No. 3,974,266 and Partridge U.S. Pat. No. 3,563,702 all produce chlorine gas along with chlorine dioxide. While for many bleaching applications solutions containing both chlorine and chlorine dioxide may be useful, free chlorine gas may form compounds which are unwanted in some applications, and, in particular, chlorine is likely to form compounds such as trihalomethanes, which are known carcinogens. Therefore, it is desirable to have a continuous-flow process for production of chlorine dioxide for food related applications, without simultaneous production of free chlorine.

Additional processes for production of chlorine dioxide are disclosed, for example, in Jaszka U.S. Pat. No. 3,950,500, and in Rapson U.S. Pat. No. 2,481,240, which discloses apparatus and a continuous-flow process for production of chlorine dioxide by reaction of sodium chlorate with sulfur dioxide, a poisonous gas, in a packed column reactor.

Partridge et al. U.S. Pat. No. 3,563,702 discloses use of a single vessel generator-evaporater-crystallizer in a process for producing chlorine dioxide. In the Partridge process a venturi eductor is used to reduce pressure within the vessel to remove the gaseous reaction products. Partridge, however, does not further disclose particular apparatus applicable for production of chlorine dioxide.

Another known apparatus for production of chlorine dioxide comprises a packed column into which metered amounts of sodium chlorite and acid are continuously fed at the bottom. Air admitted at the bottom sweeps the reactants and gaseous products of reaction upward through the packed column. An open-ended drain tube connected to a venturi nozzle extends upward to a point near the top of the packed column to maintain the liquid reactant level and remove both liquids and gases, while the venturi reduces pressure within the apparatus. While this apparatus is an improvement over a simple enclosed vessel and a batch process, it is still relatively inefficient in terms of conversion of all available chlorine to chlorine dioxide.

It is well known that sodium hypochlorite and sodium chlorite react with sulfuric acid, yielding chlorine dioxide, sodium chloride, sodium sulfate, and water, in a reversible reaction. In the past this reaction has been carried out in a batch process, as mentioned in Woodward U.S. Pat. No. 2,745,714. While this reaction produces chlorine dioxide without the undesirable chlorine by-product of several continuous-flow processes, the apparatus formerly used has been an inefficient way to produce chlorine dioxide, in terms of the amount of chlorine dioxide produced from a given input of sodium chlorite, and of production in a given amount of time.

What is needed, therefore, is an inexpensive efficient continuous-flow apparatus for producing chlorine dioxide without chlorine gas, and without production of dangerously explosive mixtures of chlorine dioxide and air. It is also desirable to simultaneously produce a solution of chlorine dioxide in water, ready for use in bleaching or as a biocide, and also free from danger of explosion, and to produce the chlorine dioxide without having to handle poisonous gases in the process.

SUMMARY OF THE INVENTION

The above-mentioned shortcomings and drawbacks of the prior art apparatus and processes for producing chlorine dioxide are overcome by the present invention, which provides an inexpensive, efficient apparatus for a continuous-flow process for producing chlorine dioxide without the use of toxic gases such as sulfur dioxide and chlorine, and without simultaneous production of chlorine gas. The apparatus of the present invention is a columnar, multi-stage gas generator-reactor, which may be constructed from readily available polyvinyl chloride pipe and sheet material, into which continuous-flow supplies of reactants in aqueous solution are introduced to continuously release chlorine dioxide. A venturi nozzle eductor removes chlorine dioxide gas from the gas generator-reactor and mixes it with a fluid such as water, as the chlorine dioxide gas is evolved by a reaction between sodium chlorite, sodium hypochlorite, and an acid.

The gas generator-reactor of the invention comprises a generally cylindrical outer shell within which a plurality of reaction chamber stages are stacked vertically one upon another. Double vapor locks are provided between stages so that liquid reactants are allowed to flow serially from one stage into the next lower stage, but the gas evolved within each stage is not allowed to contact the liquid reactants within other stages. Each stage has a reaction chamber with open space above the liquid reactant level, and gas evolved within each stage is allowed to exit from the stage through a plurality of ports having a total exit area great enough to prevent buildup of pressure within any stage, yet preferably small enough so that an outward direction of flow from each stage is maintained. As a result of evolution of chlorine dioxide in each stage the concentration of the original reactants is less in each successive stage.

The multiple stage construction of the gas generator-reactor apparatus of the present invention provides a large amount of surface area compared to the volume of liquid reactants, particularly as the liquid reactants are flowing from one stage to the next lower stage, to enhance free release of chlorine dioxide gas from the liquid reactants. The flow rate of the reactants is controlled to provide sufficient contact time, and the flow between stages produces sufficient turbulence, to cause the reaction to proceed efficiently in a forward direction, releasing chlorine dioxide gas into the space above the liquid reactants within each reaction chamber. A high vacuum is maintained within the entire generator-reactor by the venturi nozzle eductor, which immediately removes chlorine dioxide as it is released from the liquid reactants. Consequently the reaction cannot proceed in the reverse direction within the gas generator-reactor.

When the eductor is water driven, as in the preferred embodiment of the invention, the chlorine dioxide gas dissolves in the eductor drive water as it exhausts from the eductor, forming a solution of chlorine dioxide in water in which the chlorine dioxide concentration depends on the flow rates of reactants and eductor drive water. This solution, which may have a chlorine dioxide concentration in the range of 250 to 1300 ppm, may be mixed into a supply of receiving water in order to further dilute the chlorine dioxide solution to a desired concentration for use.

Dilution of the chlorine dioxide solution in the eductor is great enough so that the spent reactants and other dissolved products of the reaction may be removed from the gas generator by the same eductor, maintaining the flow of reactants through the generator, without the reaction thereafter proceeding significantly in the reverse direction. It is also possible to use a separate eductor or pump to remove the liquid reactants from the reaction chamber of the final stage, or to use a gas-driven eductor to remove the chlorine dioxide as gas instead of in solution in water.

It is therefore a primary objective of the present invention to provide an apparatus and process for production of chlorine dioxide more efficiently than has been previously possible.

It is another primary objective of the present invention to provide an inexpensive apparatus for continuous-flow production of chlorine dioxide free from chlorine gas.

It is a further objective of the present invention to provide a process and apparatus for production of chlorine dioxide free from the dangers of explosive mixtures.

It is a feature of the present invention that double vapor locks prevent transfer of chlorine dioxide gas between the stages of the generator-reactor, yet allow liquid reactants to freely progress from stage to stage.

It is another feature of the present invention that a venturi nozzle eductor maintains a suitably low pressure within the generator-reactor to promote more efficient liberation of chlorine dioxide than has been possible previously.

The foregoing objectives, features and advantages of the present invention will be more readily understood upon consideration of the following detailed description of the invention taken in conjunction with the accompanying drawings.

BRIEF DESCRIPTION OF THE DRAWINGS

FIG. 4 is a partially cut-away schematic sectional view of a multi-stage columnar gas generator-reactor which is an alternative embodiment of the present invention.

DETAILED DESCRIPTION OF THE INVENTION

Figure 1:
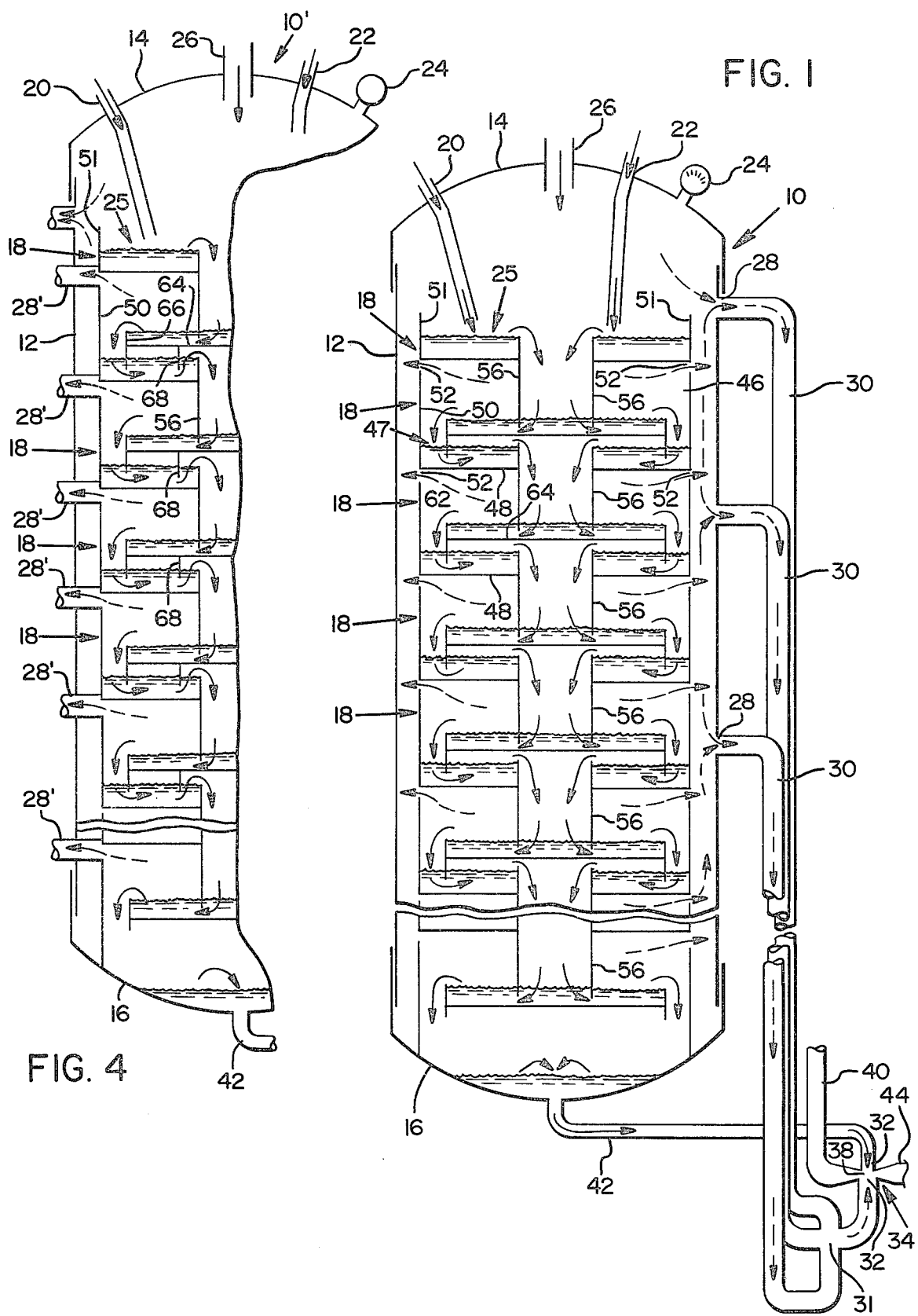
FIG. 1 is a partially cut-away schematic sectional view of a multi-stage, columnar, continuous-flow, gas generator-reactor for generating chlorine dioxide which embodies the present invention.

Referring now to FIG. 1 of the drawings, a multi-stage columnar chlorine dioxide generator-reactor 10 which embodies the present invention comprises a vertically oriented, generally cylindrical outer shell 12 having an upper end cap 14 and a lower end cap 16. Within the outer shell 12 a plurality of reactor stages 18, separated by double vapor locks, are stacked one upon another in a vertical array and interconnected in a series arrangement allowing transfer of reactants from each reactor stage to the next adjacent reactor stage in the series. Reactant admission pipes 20 and 22 are located in the upper end cap 14 to allow admission of chemical reactant solutions into a initial reaction tray 25, and additional similar pipes could also be included. A vacuum gauge 24 provides an indication of the vacuum within the outer shell 12. The locations of the reactant admission pipes 20 and 22 and the gauge 24 are shown schematically in FIG. 1, and it is to be understood that the locations of the reactant admission pipes could be varied to provide a desired amount of physical agitation, depending on the rate of flow of the chemical reactants. A flooding water admission pipe 26 is centrally located in the upper end cap to admit flooding water to dilute the reactants and thereby slow the reaction being carried out within the gas generator-reactor in case of an emergency.

A plurality of vacuum taps 28 are located in the top half of the outer shell 12, and interconnecting gas removal pipes 30 extend from the vacuum taps to a junction 31 connected to the suction side 32 of an eductor 34. The eductor 34 comprises a venturi nozzle having a throat 38, and is driven preferably by a pressurized supply of eductor drive water fed through a water supply pipe 40. It is, of couse, possible to force other fluids, if desired, through the venturi nozzle to develop the desired vacuum. An eductor nozzle, model 14-A, part No. E-230, manufactured by Chlorinators, Inc. of Jensen Beach, Fla., has been found to be suitable with this embodiment of the gas generator-reactor of the invention.

A spent reactant drain 42 located in lower end cap 16 of the gas generator-reactor carries spent reactants and liquid products of reaction from the bottom of the gas generator-reactor to the eductor 34. A discharge pipe 44 carries the water supply, gas, and spent reactants away from the eductor as a single eductor exhaust stream.

The entire gas generator-reactor may be constructed of polyvinyl chloride plastic pipe and sheet material, either glued or welded to provide a gas-tight construction. The polyvinyl chloride material is not corroded by the reactants used in the process of the invention and is readily available as pipe with walls thick enough to withstand atmospheric pressure when the interior is evacuated.

Figure 2:
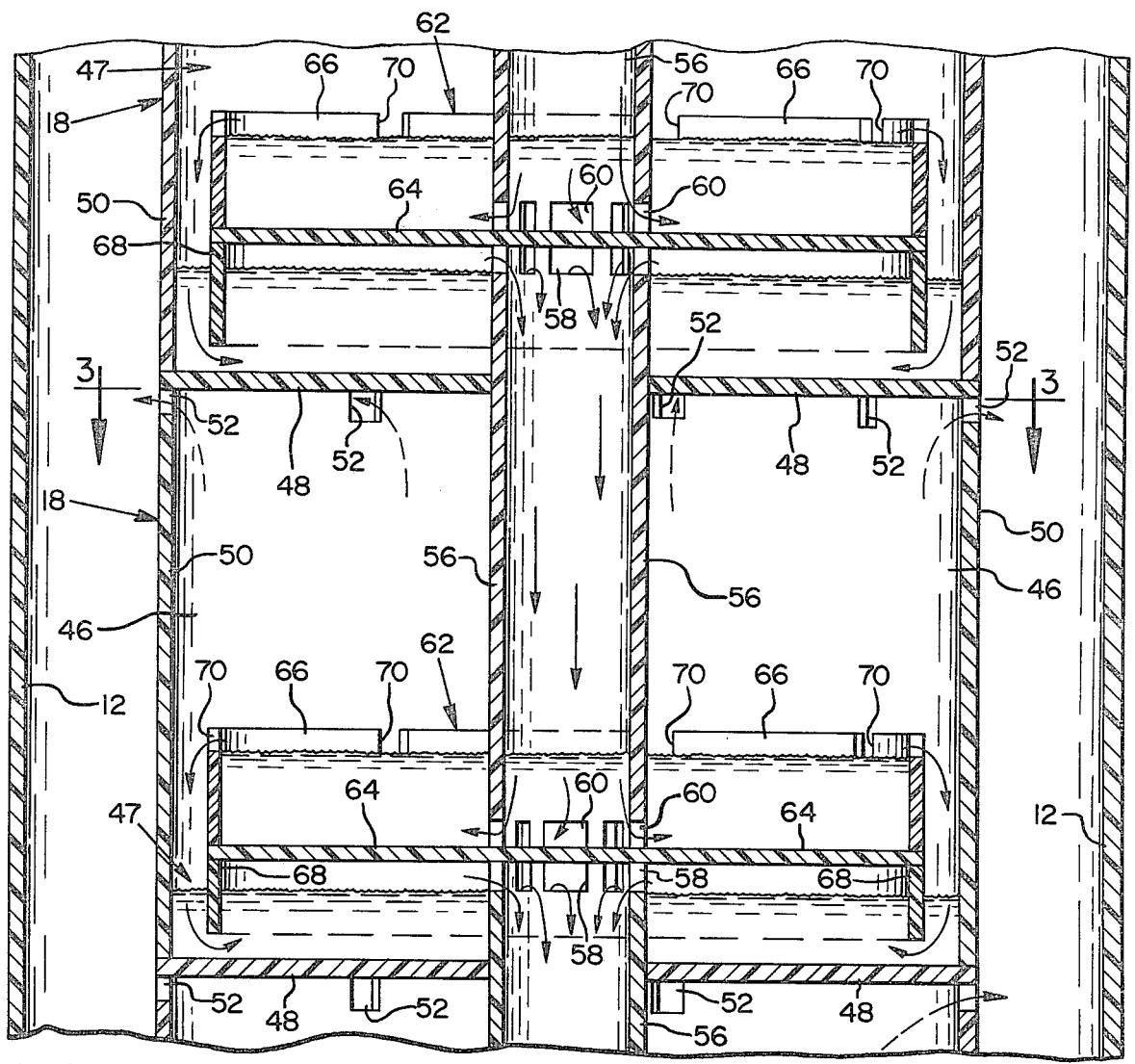
FIG. 2 is a sectional view of one stage of the gas generator-reactor of FIG. 1, at an enlarged scale.
Figure 3:
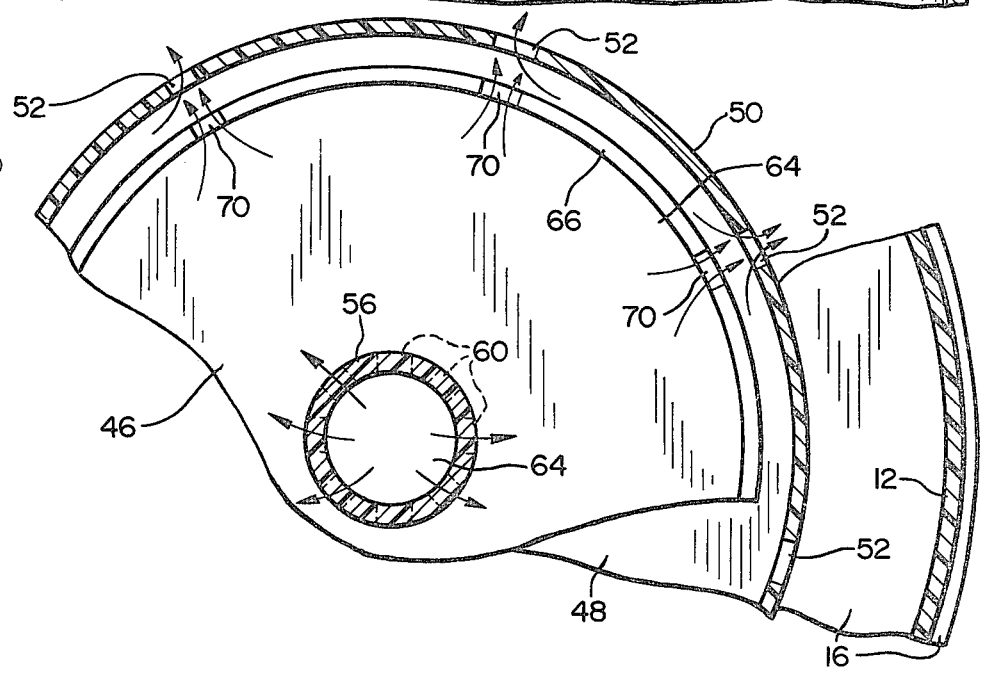
FIG. 3 is a partially cut-away sectional top view of the reactor stage shown in FIG. 2, taken along line 3—3.

Referring now also to FIGS. 2 and 3, a typical single reactor stage 18 of the gas generator-reactor may be seen to comprise a generally cylindrical reaction chamber 46. The reaction chamber 46 comprises a lower tray 47 having a bottom 48 and a generally cylindrical chamber wall 50 extending upward and supporting the tray bottom 48 of the next higher reactor stage 18, except in the top reactor stage 18, where a chamber wall 51 is shorter in height. Distributed around the upper portion of the chamber wall 50 are a plurality of gas escape ports 52 which have a total area sufficient to allow gas to be removed immediately as it is formed.

Liquid reactants are allowed to flow downward from stage to stage, yet gases from each reactor stage are prevented from passing directly into another reactor stage, by a double vapor lock arrangement. Each double vapor lock arrangement comprises a conduit such as a central pipe 56 which passes vertically through the center of each lower tray bottom 48. The central pipe 56 extends upwardly into the reaction chamber 46 and includes overflow orifices 58 spaced a predetermined distance above the lower tray bottom 48, to preserve a predetermined depth of liquid reactants in the lower tray 47. The central pipe 56 also extends downward, into the next lower stage 18, where its lower end abuts against a bottom plate 64 of an upper tray 62 of the next lower stage 18. A plurality of flow ports 60 are defined in the lower end of the central pipe 56 to allow liquids to flow out from the central pipe 56 into the next lower stage 18. A bottom plate 64 of an upper tray 62 is supported by the upper end of the central pipe 56 and covers the top of the central pipe 56 except for the overflow orifices 58. The central pipe 56 of the next higher reactor stage, supported by the upper tray 62, extends upward through the lower tray bottom 48 of the next higher reactor stage, which encloses the top of the reaction chamber 46. The upper tray 62 has an upper peripheral rim 66 which extends above the bottom 64, and a lower rim 68. The lower rim encircles the central pipe 56, extending below the bottom plate 64 to a level between the bottom of each overflow orifice 58 and the lower tray bottom 48, and forming the first vapor lock of the double vapor lock arrangement.

The upper peripheral rim 66 extends to a level higher than the tops of the flow ports 60 of the central pipe 56 extending upward from the upper tray 62, forming the other of the two vapor locks. Overflow notches 70, the lowest points of which are of equal height and are also above the uppermost point of each of the flow ports 60, are defined in the edge of the upper peripheral rim 66.

While the use of a double vapor lock encloses the gases within the central pipe 56 between the vapor locks, this enclosed volume is small compared to the total volume of the gas generator-reactor. Additionally, the lower rim 68 may be located spaced inwardly from the edge of the bottom plate 64, as indicated in FIG. 4, to provide more gas generating surface within the reaction chamber 46 and further reduce the volume enclosed within the double vapor lock arrangement.

Although the double vapor lock is preferred because of its more positive separation of individual gas generation stages 18, the lower rim 68 may be eliminated entirely and a single vapor lock would still separate the stages.

In a preferred embodiment of the invention, the shell 12 is of $\frac{3}{8}$ inch wall thickness with a six (6) inch inside diameter, and the outside diameter of each cylindrical reaction chamber wall 50 is about $5\frac{1}{2}$ inches. The reaction chamber walls 50 are of piping having approximately $\frac{1}{4}$ inch wall thickness, giving an inside diameter of five inches, while the outer diameter of each upper tray 62 is $4\frac{1}{2}$ inches, creating an annular space having a radial depth of about $\frac{1}{4}$ inch between the upper tray and the inside of the chamber wall. The overflow notches 70 provide a $\frac{3}{4}$ inch liquid depth in the upper tray 62, while the flow ports 60 are $\frac{1}{4}$ inch high, providing $\frac{1}{2}$ inch of liquid in the vapor lock between the lowest liquid level and the highest part of the flow ports 60.

The upper tray 62 is spaced preferably one inch above the lower tray bottom 48, with the bottoms of the overflow orifices 58 spaced $\frac{3}{4}$ inch above the lower tray bottom 48. The lower peripheral rim 68 preferably extends $\frac{3}{4}$ inch below the upper tray 62, also providing a $\frac{1}{2}$ inch effective sealing height of liquid in the other vapor lock.

Referring now also to FIG. 4, an alternative embodiment 10′ of the gas generator-reactor of FIG. 1 may be seen. In such an alternative embodiment, a separate vacuum tap 28′ is provided for each stage 18 of the gas generator. Each vacuum tap 28′ may be connected to a separate eductor 34, to provide additional segregation between stages. Similarly, a separate eductor (not shown) may be used to remove the spent reactants from the bottom of such an alternative embodiment of the gas generator-reactor of the invention. of course, in the gas generator-reactor 10′ care must be taken to prevent excessive pressure differential between stages 18 since a pressure differential greater than the pressure head of about $\frac{1}{2}$ inch of water could cause gas flow through the vapor locks, reducing efficiency of operation. The double vapor lock arrangement is particularly applicable to prevent migration of chlorine dioxide in this embodiment of the invention.

In operation of the gas generator-reactor 10 of the present invention, solutions of the appropriate chemical reactants are admitted in appropriate proportions as a continuous flow of each of the individual reactants. Each reactant is prepared in the appropriate predetermined solution strength, and admitted at a predetermined rate, which may be controlled, as by metering valves and the like (not shown). The transfer of reactants from each reactor stage 18 to the next under influence of gravity results in a net forward flow and prevents reverse flow of the reactants.

In a preferred application, the gas generator-reactor 10 or 10′ is used to produce chlorine dioxide gas and to produce therefrom a solution of chlorine dioxide gas in water. This is preferably accomplished by a reaction between sodium hypochlorite and sodium chlorite in sulfuric acid, to produce chlorine dioxide, sodium chloride, sodium sulfate and water, according to the following reaction equation:

$$NaOCl + H_2SO_4 + 2NaClO_2 \rightleftharpoons 2ClO_2 + NaCl + Na_2SO_4 + H_2O$$

This reaction produces one mole of chlorine dioxide from each mole of sodium chlorite, without producing chlorine gas.

The reactants are continuously fed into the initial reaction tray 25 of the gas generator-reactor 10, and the chlorine dioxide gas produced by the reaction is immediately removed by way of the vacuum tap 28. Removal of the chlorine dioxide gas as quickly as it is liberated in each reactor stage 18 of the gas generator-reactor prevents reversal of the reaction, providing much better efficiency than the prior art batch process.

As additional fresh reactants are fed into the initial reaction tray 25, the mixture of liquid reactants overflows from the reaction tray 25 via the overflow orifices 58 on the top edge of the central pipe 56. The overflowing reactant mixture then flows through the flow ports 60 at the bottom end of the central pipe 56, filling the upper tray 62 of the next lower reactor stage 18 to the level of the bottoms of the overflow notches 70 of the upper rim 64 of the upper tray 62. Consequently the level of the liquid in the upper tray 62 is maintained higher than the tops of the flow ports 60, preventing gas flow from one reactor stage into another unless there is a sufficient pressure differential between stages.

As the liquid reactants flow from one reactor stage to the next, having liberated that part of the chlorine dioxide gas which is produced by the reaction, the concentration of the sodium hypochlorite, sodium chlorite and sulfuric acid decreases, while the concentration of sodium chloride and sodium sulfate increases. Since the chlorine dioxide is removed as soon as it is evolved, and because of the reduced pressure within the apparatus, additional chlorine dioxide is liberated in each succeeding reactor stage 18 even though the sodium chloride and sodium hypochlorite concentrations are less in the lower reactor stages 18 of the gas generator-reactor 10.

By use of an appropriate number of reactor stages 18, use of the appropriate rates of flow of reactants having appropriate initial concentrations, and maintenance of a predetermined reduced pressure within the reactor outer shell 12, the gas generator-reactor of the invention can be used to produce chlorine dioxide much more efficiently than was previously possible.

The combined rate of flow of reactants into the gas generator is selected so that in a preferred embodiment of the invention, in which nine stages 18 are vertically arrayed, the liquid reactants flow through the entire generator in about nine minutes, thus staying in each stage for an average of about one minute. About 30–35% of the maximum amount of chlorine dioxide which could theoretically be produced by the reaction is liberated in the first stage. The solution which overflows to the next stage thus has 65–70% as much chlorine dioxide theoretically available as that initially available in the first stage, and about 30–35% of this reduced amount is released in the second stage. This reduction of yield occurs again in each successive transfer between stages, resulting in eventual release of a high percentage of the initially available chlorine dioxide during the flow of reactants through the entire apparatus.

For example, a 5.25% solution (by weight) of sodium hypochlorite, and a 16% solution (by weight) of sodium chlorite in water were provided in equal quantities, and a 7.4% solution (by weight) of sulfuric acid in water was supplied in a quantity equal to the total of the other two solutions to provide a stoichiometric mixture comprising one mole of sodium hypochlorite to two moles of sodium chlorite to one mole of sulfuric acid, at a total flow rate of 5 gallons per hour, to produce a nine-minute retention time for the liquid reactants. Water was pumped through the water supply pipe 40 into the eductor 54 at a rate of 300 gallons per hour, to produce a vacuum of 26 inches of mercury below atmospheric pressure within the outer shell 12.

The amount of chlorine dioxide produced was measured by determining the concentration of chlorine dioxide in the discharge from the eductor and multiplying by the total flow rate of reactants and eductor drive water. The efficiency of the reaction, in terms of pounds per hour of chlorine dioxide produced, compared to the chlorine dioxide theoretically available in the amount of reactants used, was 91.5%.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A continuous-flow method for manufacture of chlorine dioxide, comprising:
   (a) supplying a continuous flow of solutions of each of a chlorite and a hypochlorite and an acid into the first of a plurality of reaction chambers arranged in order of descending height;
   (b) allowing liquid reactants from each except the bottom one of said reaction chambers to overflow into the next lower reaction chamber;
   (c) preventing gaseous reaction products from flowing from one reaction chamber to another; and
   (d) removing gaseous reaction products from each reaction chamber.

2. The method of claim 1 including the further step of using a venturi eductor to maintain reduced pressure within each of said reaction chambers, to remove gases evolved from the reactants in each reaction chamber, and to maintain reduced pressure within the reactor vessel.

3. The method of claim 2 including the further step of supplying water under pressure to operate the venturi eductor, and dissolving the gaseous products of the reaction in the water exhausted from the venturi eductor.

4. The method of claim 1 comprising the further steps of allowing the reactants to remain for a predetermined reaction time in each reaction chamber and removing liquid and dissolved solid products of reaction from the last reaction chamber after a predetermined total reaction time.

5. The method of claim 4, wherein said predetermined time is about one minute and said predetermined total reaction time is about nine minutes.

6. The method of claim 1 wherein the chlorite is sodium chlorite, the hypochlorite is sodium hypochlorite, and the acid is sulfuric acid.

7. The method of claim 6 including supplying said sodium chlorite, sodium hypochlorite, and sulfuric acid in stoichiometric proportions.

* * * * *